F. SCHARDT.
CHICKEN ROOST.
APPLICATION FILED JULY 8, 1912.
1,087,833.
Patented Feb. 17, 1914.
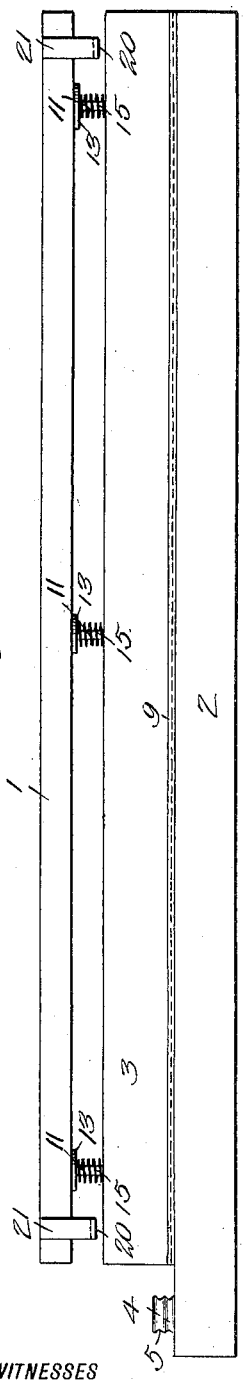
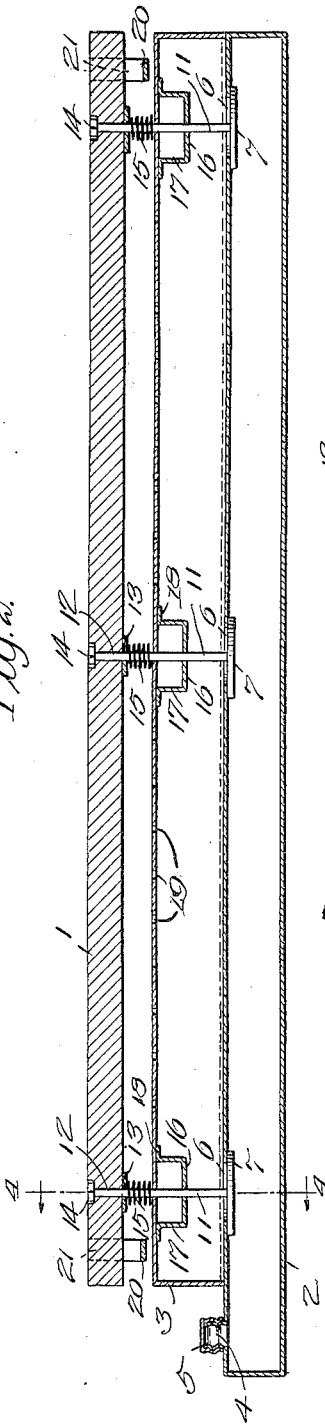
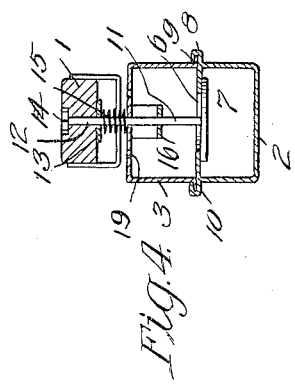
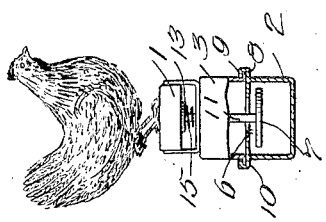
WITNESSES
INVENTOR
Fred Schardt
BY
ATTORNEYS

UNITED STATES PATENT OFFICE.

FREDERICK SCHARDT, OF ARAPAHOE, NEBRASKA.

CHICKEN-ROOST.

1,087,833.  Specification of Letters Patent.  Patented Feb. 17, 1914.

Application filed July 8, 1912. Serial No. 708,174.

*To all whom it may concern:*

Be it known that I, FREDERICK SCHARDT, a citizen of the United States, and a resident of Arapahoe, in the county of Furnas and State of Nebraska, have invented certain new and useful Improvements in Chicken-Roosts, of which the following is a specification.

My invention is an improvement in chicken roosts, and has for its object the provision of a device of the character specified, wherein a roost is provided, upon which the fowls may perch, and means in connection with the roost for containing chemicals or the like for destroying vermin on the fowls, and so arranged that when the perch is unoccupied, the chemical containing means will be closed, and will be opened to permit the medicinal agents to escape when the perch is occupied by the fowls.

In the drawings:—Figure 1 is a front view of the improved roost, Fig. 2 is a vertical longitudinal section, Fig. 3 is an end view of the parts broken away, and Fig. 4 is a section on the line 4—4 of Fig. 2.

The present embodiment of the invention comprises a bar 1, of suitable material, as for instance wood, of suitable length, depending upon the building in which it is to be arranged and of such width that the fowls may perch or rest upon the top thereof. Below the roost is arranged a plurality of tanks or reservoirs 2 and 3, the former being of rectangular cross section and of slightly greater length than the tank or reservoir 3, and extending beyond the said reservoir 3 at one end as shown in Figs. 1 and 2.

A threaded nipple 4 is provided in the top of the tank 2 at the extended end, for permitting access to the interior thereof, and the said nipple is normally closed by a cap 5. A plurality of openings 6, (3 in the present instance) is provided in the upper face of the tank or reservoir 2, and a disk valve 7 coöperates with each of the said openings for closing the same.

The tank or reservoir 3 is arranged directly above the reservoir 2, the top of the reservoir 2 forming the bottom of the reservoir 3. As will be seen from an inspection of Figs. 3 and 4, the top of the reservoir 2 is flanged laterally at each side as indicated at 8. The tank or reservoir 3 is approximately U-shaped in cross section, consisting of a top and sides and the lower edge of each of the sides is flanged laterally outward and then inward to form a guideway 10 for receiving the adjacent extended edge 8 of the top of the reservoir 2.

Each valve 7 is provided with a stem 11, the said stem extending upwardly through an opening in the top of the tank or reservoir 3, and each stem passes through an opening 12 in the roost or perch 1. A washer or collar 13 is secured to each stem below the perch 1, and a nut or head 14 is engaged with the upper end of the stem above the perch, each nut or head being received in a countersunk recess in the perch.

A spring 15 encircles each stem between the washer 13 and the top of the tank or reservoir 3, the said spring acting normally to force the perch upward and to close the valves 7. Adjacent to each stem, a guide in the form of a stirrup is secured to the under face of the top of the tank or reservoir 3, each stirrup comprising a body 16 and arms 17.

The body of each stirrup is provided with an opening through which the stem extends and the arms 17 thereof are flanged laterally as shown at 18 and secured to the under face of the top of the tank 3 in any suitable manner. The said top of the tank or reservoir 3 is provided with a plurality of longitudinally extending series of openings 19, and the perch is provided with a hanger near each end, each hanger consisting of a body 20 below the perch and arms 21 engaging the sides of the perch and secured thereto in any suitable manner. The hangers act as stops to limit the downward movement of the perch and the body 20 of each hanger is spaced below the perch a sufficient distance to permit the valves 7 to be opened when the perch is depressed.

In operation, the improved roosts are arranged in any desired manner, and the tank or reservoir 2 is filled with any suitable fluid that will by its fumes kill the vermin without injuring the fowls. The filling is done by means of the cap 5 and the nipple 4. As long as the perch is unoccupied, the valve 7 will be closed by the spring 15 and the fumes will not escape from the tank or reservoir. As soon however, as the fowls have gone to roost, the perch will be depressed until the bodies 20 of the hangers engage the top of the tank or reservoir 3. The valves 7 are thus opened and the fumes escape into the reservoir 3, and through the openings 19, pass out of the said reservoir.

The fowls are directly above the escaping fumes, and it will be evident that the said fumes will thoroughly disinfect the same, effectually ridding them of vermin.

The upper reservoir 3 is for the purpose of permitting the fumes that escape from the reservoir 2 to expand and to mix thoroughly with the air before escaping through the series of openings 19. The fumes passing upward through the openings 6 would tend to disinfect merely that portion of the roost directly above them, and the reservoir 3 is to distribute the fumes and to make the disinfection uniform.

It will be understood that the reservoirs 2 and 3 are of metal, as for instance, tin or galvanized iron. In the construction of the said reservoirs, the bottom and ends and sides of the reservoir 2 are first formed, after which the top is soldered to the edges of the sides and ends, the valves 7 being first inserted.

I claim:—

1. A device of the character specified, comprising a perch, a reservoir arranged below the perch and extending longitudinally thereof, said reservoir having a plurality of outlet ports in its upper face, and a filling opening at one end, a closure for the said filling opening, a disk valve coöperating with each of the outlet ports, a stem rigidly connecting each valve to the perch, a second reservoir above the first reservoir, the outlet ports opening into the second reservoir, a spring encircling each stem and bearing at one end against the top of the upper reservoir, a collar rigidly connected with the stem below the perch and against which the upper end of the spring bears, and a hanger at each end of the perch for limiting the downward movement thereof with respect to the reservoirs, said second reservoir having outlet openings in its top.

2. A device of the character specified, comprising a perch, a reservoir arranged below the perch and extending longitudinally thereof, said reservoir having a plurality of outlet ports in its upper face, and a filling opening at one end, a closure for the said filling opening, a disk valve coöperating with each of the outlet ports, a stem rigidly connecting each valve to the perch, a second reservoir above the first reservoir, the outlet ports opening into the second reservoir, a spring encircling each stem and bearing at one end against the top of the upper reservoir, and at the other end against the perch, the spring normally holding the valve closed, and means for limiting the downward movement of the perch with respect to the reservoirs, said second reservoir having outlet openings in its top.

3. A device of the character specified, comprising a perch, a reservoir extending longitudinally of the perch below the same, said reservoir having a plurality of outlet ports in its upper face, a second reservoir above the first, the outlet ports opening into the said second reservoir, a valve for controlling each of the said ports, a rigid connection between each valve and the perch, springs between the perch and the reservoirs for holding the valves closed, and means for limiting the downward movement of the perch, said upper reservoir having a plurality of outlet openings in its top.

4. A device of the character specified, comprising a perch, a reservoir arranged below the perch and extending longitudinally thereof and having outlet openings in its top, valves for controlling the openings, a rigid connection between each valve and the perch for opening the valve when the perch is depressed, springs normally retaining the perch in elevated position, and means for limiting the downward movement of the perch with respect to the reservoir.

5. A device of the character specified, comprising a perch, a reservoir arranged below the perch and extending longitudinally thereof and having outlet openings in its top, valves for controlling the openings, a rigid connection between each valve and the perch for opening the valve when the perch is depressed, and springs normally retaining the perch in elevated position.

6. A device of the character specified, comprising a movable perch, a fixed reservoir below the perch, said reservoir having outlet openings, means connected with the perch for closing the openings and springs pressing the perch upward to normally hold the openings closed, a stop for limiting the movement of the perch with respect to the reservoir, and a mixing reservoir between the perch and the first-named reservoir, said the perch and the first-named reservoir communicating with last-named reservoir and having distributing openings at the perch.

7. A device of the character specified, comprising a movable perch, a fixed reservoir below the perch, said reservoir having outlet openings, means connected with the perch for closing the openings, and springs pressing the perch upward to normally hold the openings closed.

FRED SCHARDT.

Witnesses:
J. E. SUSANSON,
CHAS. A. PATTERSON.

Copies of this patent may be obtained for five cents each, by addressing the "Commissioner of Patents, Washington, D. C."